US012664897B2

(12) United States Patent
Smith et al.

(10) Patent No.: US 12,664,897 B2
(45) Date of Patent: Jun. 23, 2026

(54) SYSTEM AND METHOD TO AVOID OBSTACLES IN AN AUTONOMOUS UNMANNED MARITIME VEHICLE

(71) Applicant: Ocean Aero, Inc., Gulfport, MS (US)

(72) Inventors: Charles Smith, Gulfport, MS (US);
Matthew Kuhn, Diberville, MS (US);
Jeremy Todter, Margaret River (AU);
Mark Henderson, Kiln, MS (US)

(73) Assignee: Ocean Aero, Inc., Gulfport, MS (US)

( * ) Notice: Subject to any disclaimer, the term of this patent is extended or adjusted under 35 U.S.C. 154(b) by 214 days.

(21) Appl. No.: 18/522,410

(22) Filed: Nov. 29, 2023

(65) Prior Publication Data

US 2024/0194078 A1 Jun. 13, 2024

Related U.S. Application Data

(60) Provisional application No. 63/432,211, filed on Dec. 13, 2022.

(51) Int. Cl.
| | |
|---|---|
| *G07C 5/00* | (2006.01) |
| *G01S 15/08* | (2006.01) |
| *G01S 15/93* | (2020.01) |
| *G05D 1/00* | (2006.01) |
| *G06V 10/764* | (2022.01) |
| *G06V 20/58* | (2022.01) |
| *G07C 5/02* | (2006.01) |
| *G07C 5/04* | (2006.01) |
| *G07C 5/08* | (2006.01) |
| *G08G 3/02* | (2006.01) |

(52) U.S. Cl.
CPC ................ *G08G 3/02* (2013.01); *G01S 15/08* (2013.01); *G01S 15/93* (2013.01); *G05D 1/0206* (2013.01); *G06V 10/764* (2022.01); *G06V 20/58* (2022.01)

(58) Field of Classification Search
CPC ........... G08G 3/02; G01S 15/08; G01S 15/93; G05D 1/0206; G06V 10/764; G06V 20/58
See application file for complete search history.

(56) References Cited

U.S. PATENT DOCUMENTS

| | | | | |
|---|---|---|---|---|
| 9,734,583 | B2 * | 8/2017 | Walker | G01C 21/203 |
| 10,571,926 | B1 * | 2/2020 | Zhang | G05D 1/0274 |
| 12,066,579 | B2 * | 8/2024 | Vanhakartano | G01S 7/24 |
| 2017/0169570 | A1 * | 6/2017 | Vashishtha | G06V 40/19 |

(Continued)

*Primary Examiner* — Kito R Robinson
*Assistant Examiner* — Anthony Gabriel Mora
(74) *Attorney, Agent, or Firm* — David Todd Shoneman; Michael A. Pugel

(57) ABSTRACT

A method and system for detecting and avoiding an obstacle of an autonomous unmanned maritime vehicle (UMV) traveling in an initial direction are described. The method and system include receiving a video image from at least one image sensor, the video image containing an object that has been identified as an obstacle, determining if the object can be associated with an object class from the plurality of predetermined object classes, accessing a mean height value for the object class if it determined that the object can be associated with an object class from the plurality of predetermined object classes, determining a distance between the UMV and the object based on a height of the object as displayed in the video image and the mean height for the object class, and automatically adjusting the navigational control of the autonomous UMV to travel in an adjusted direction.

20 Claims, 8 Drawing Sheets

(56)                  References Cited

U.S. PATENT DOCUMENTS

| | | | | |
|---|---|---|---|---|
| 2017/0293302 A1* | 10/2017 | Johnson | ............... | G05D 1/0206 |
| 2018/0162502 A1* | 6/2018 | McClure | .................. | B63G 8/04 |
| 2020/0250945 A1* | 8/2020 | Liiv | ................ | G08B 13/19671 |
| 2021/0214058 A1* | 7/2021 | Hine | ........................ | B63B 1/121 |
| 2022/0187830 A1* | 6/2022 | Liu | .......................... | G08G 3/00 |
| 2022/0198677 A1* | 6/2022 | Bisain | ..................... | G06T 7/174 |
| 2024/0127579 A1* | 4/2024 | Capellier | ............. | G05D 1/0274 |

* cited by examiner

600

Receive video image including an object identified as an obstacle — 610

Object associated with object class from set of classes? — 620

N

Y

Access mean height for object class — 630

Determine distance based on height of object and mean height of object class — 640

Adjust navigational control to travel in a different direction based on distance — 650

SYSTEM AND METHOD TO AVOID OBSTACLES IN AN AUTONOMOUS UNMANNED MARITIME VEHICLE

CROSS-REFERENCE TO RELATED APPLICATION

This application claims the benefit, under 35 U.S.C. § 119(e), of U.S. Provisional Patent Application 63/432,211, filed on Dec. 13, 2022 which is incorporated herein in its entirety.

TECHNICAL FIELD

The present disclosure generally relates to operations of unmanned maritime vehicles (UMV), and in particular, to detection of objects identified as obstacles and avoiding the objects as part of operation of an autonomous UMV.

BACKGROUND

Any background information described herein is intended to introduce the reader to various aspects of art, which may be related to the present embodiments that are described below. This discussion is believed to be helpful in providing the reader with background information to facilitate a better understanding of the various aspects of the present disclosure.

UMVs are often deployed for various uses within bodies of water including, but not limited to, provided monitoring of equipment in the body of water, location services, and the like. Current UMVs do not include onboard systems utilizing above and below water sensors to ensure the UMV is aware of the presence of obstacles around it. It would be desirable to have an ability to (i) understand the relative position of those obstacle around the UMV (for example in front of, behind, to the side, etc.), (ii) the distance between the obstacles and the UMV and (iii) methods for managing the behavior of an uncrewed maritime vehicle (UMV) in the presence of obstacles.

Existing approaches to assessing the presence of obstacles near UMVs utilize only cameras and they neither integrate nor leverage any below water sensing. Further, current approaches do not include direct measurements from sensors as part of observing and assessing the immediate local environment. For example, most UMVs do not use cameras to provide automated detection and navigational changes to avoid obstacles around them. Rather, they provide camera output to human operators external to the UMVs who will make navigational decisions to alter the operation of the UMV. The approaches further do not provide options for algorithms to infer the range and bearing to those obstacles based on multiple sensor inputs. As a result, these approaches fail to provide the UMV control system operator with robust information about the surrounding environment. The present solutions to managing UMVs in relation to obstacles are dependent upon third-party inputs, such as automated identification system (AIS) inputs, and further human interaction rather than allowing the UMV to operate more autonomously based on direct assessment of the UMV's surroundings. With the increasing deployment of autonomous UMVs, which are capable of spending long periods of time in the water with little or no external communication and/or control from external sources, these shortcomings present an even greater challenge. Therefore, there is a need for a mechanism to better allow a UMV or other similar vehicle to better assess its surroundings and environment as a part of more of its operation.

SUMMARY

According to an implementation, a system for detecting and avoiding an obstacle of an autonomous unmanned maritime vehicle (UMV) traveling in an initial direction is described. The system includes at least one image sensor, the at least one image sensor configured to generate video images, a storage element configured to receive and store information associated with a plurality of predetermined object classes, and a processing unit coupled to the at least one sensor and the storage element. The processing unit configured to receive a video image from the at least one image sensor, the video image containing at least one object that has been identified as an obstacle, determine if the at least one object can be associated with an object class from the plurality of predetermined object classes, access a mean height value for the object class from the storage unit if it is determined that the at least one object can be associated with an object class from the plurality of predetermined object classes, determine a distance between the UMV and the at least one object based on a height of the at least one object as displayed in the video image and the mean height for the object class, and automatically adjust the navigational control of the autonomous UMV to travel in an adjusted direction.

According to an implementation, a method for detecting and avoiding an obstacle of an autonomous unmanned maritime vehicle (UMV) traveling in an initial direction is described. The method includes receiving a video image from at least one image sensor, the video image containing at least one object that has been identified as an obstacle and determining if the at least one object can be associated with an object class from the plurality of predetermined object classes. The method further includes accessing a mean height value for the object class if it determined that the at least one object can be associated with an object class from the plurality of predetermined object classes, determining a distance between the UMV and the at least one object based on a height of the at least one object as displayed in the video image and the mean height for the object class and automatically adjusting the navigational control of the autonomous UMV to travel in an adjusted direction.

BRIEF DESCRIPTION OF THE DRAWINGS

The above and other aspects, features, and advantages of the present disclosure will become more apparent in light of the following detailed description when taken in conjunction with the accompanying drawings to which the principles of the present disclosure are applicable.

DETAILED DESCRIPTION

Figure 1A:
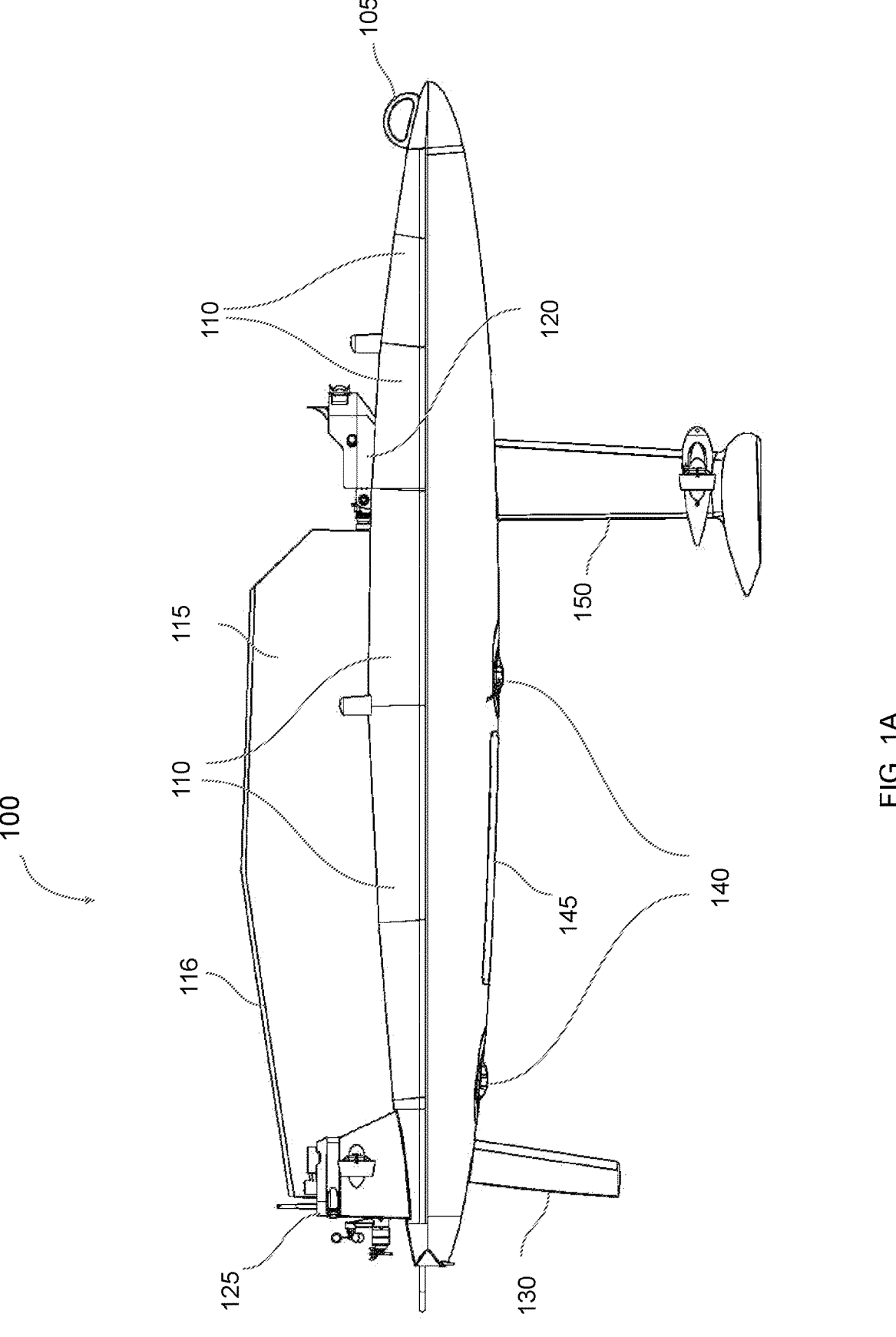
FIGS. 1A-1B are diagrams of an exemplary UMV that includes obstacle detection and avoidance according to aspects of the present disclosure.

It should be understood that the components shown in the figures may be implemented in various forms of hardware, software, or combinations on one or more appropriately programmed general-purpose devices, which may include a processor, memory, and input/output interfaces. Those skilled in the art will be able to devise various arrangements which, although not explicitly described or shown herein, embody the principles of the disclosure and are included within its scope.

All examples recited herein are intended to aid the reader in understanding the principles of the disclosure and the concepts and are to be construed as being without limitation to such specifically recited examples and conditions. Any flow charts, flow diagrams, state transition diagrams, pseudocode, and the like represent various processes which may be substantially represented in computer readable media and so executed by a computer or processor, whether or not such computer or processor is explicitly shown.

The functions of the various components shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor", "module" or "controller" should not be construed to refer exclusively to hardware capable of executing software, and may implicitly include, without limitation, a system on a chip (SoC), digital signal processor ("DSP") hardware, read only memory ("ROM") for storing software, random access memory ("RAM"), and nonvolatile storage.

As used herein, the term "processor" broadly refers to and is not limited to a single- or multi-core general purpose processor, a special purpose processor, a processor, a Graphics Processing Unit (GPU), a digital signal processor (DSP), a plurality of microprocessors, one or more microprocessors in association with a DSP core, a controller, a microcontroller, one or more Application Specific Integrated Circuits (ASICs), one or more Field Programmable Gate Array (FPGA) circuits, any other type of integrated circuit (IC), an SOC, and/or a state machine.

One or more of the aspects of the embodiments described above may be implemented using application-specific hardware. Further, one or more aspects of the embodiments may be implemented using one or more processing components, such as central processing units (CPUs) that may include specific operating instructions embedded as firmware in the processing component(s) or may operate from software code that is downloaded into the storage elements from one or more memory units coupled to the processing components (s).

The present disclosure addresses issues associated with detecting and avoiding objects that can be obstacles to the navigational course of UMVs, including autonomous UMVs. These UMVs often only use data from sensors to monitor the surrounding environments, often reporting the data externally (e.g., to remote, off vehicle, human operators) and waiting on inputs based on the reported data. Further, the sensors used on these UMVs are limited to image sensors capable of detecting objects on the water but not below the water.

Accordingly, the present disclosure creates a mechanism for detecting and avoiding an object that has been identified as an obstacle or potential obstacle to the navigational course of a UMV, such as an autonomous UMV. The object identified as an obstacle may be of man-made or natural origin. The mechanism detects the object using a plurality of sensors, including a set of image sensors configured to provide a view of the surrounding environment around the UMV. For example, the object may be detected by using a video image from an image sensor or camera. The mechanism further identifies an object from the data provided by the sensors that can be an obstacle and determines if the object can be associated with an object class from a predetermined list of object classes. The identification may further include classification or characterization of objects that may not be associated with an object class. In some embodiments, the identification may utilize machine learning using data and algorithms to improve accuracy and reliability. The mechanism additionally determines a distance between the object and the UMV using a height of the object that is determined based on the image detected by the sensors and the mean height for the object class. The mechanism adjusts the navigational control to adapt the UMV's course and behavior in response to the distance to the objects. For example, the navigational control may be an evasive maneuver. The mechanism can be used to ensure that the UMV is aware of its surrounding environment and can make appropriate autonomous decisions about its movements in support of its assigned task.

The embodiments of the present disclosure provide distinct advantages when compared to other approaches. For example, embodiments are described that provide multiple determination of distance and/or bearing to obstacles from diverse sensors such as image sensors or cameras, sound navigation ranging (SONAR), and light detection and ranging (LiDaR). Further, embodiments are described that include a robust correlation of some of the distance determinations to infer obstacle location including range and bearing along with the ability to insert this assessment into the UMV control system.

Advantages of the present disclosure will become more apparent from the detailed description given hereinafter. However, it should be understood that the detailed description and specific examples, while indicating preferred embodiments of the present disclosure, are given by way of illustration only, since various changes and modifications within the scope of the present disclosure will become apparent to those skilled in the art from this detailed description.

Figure 1B:
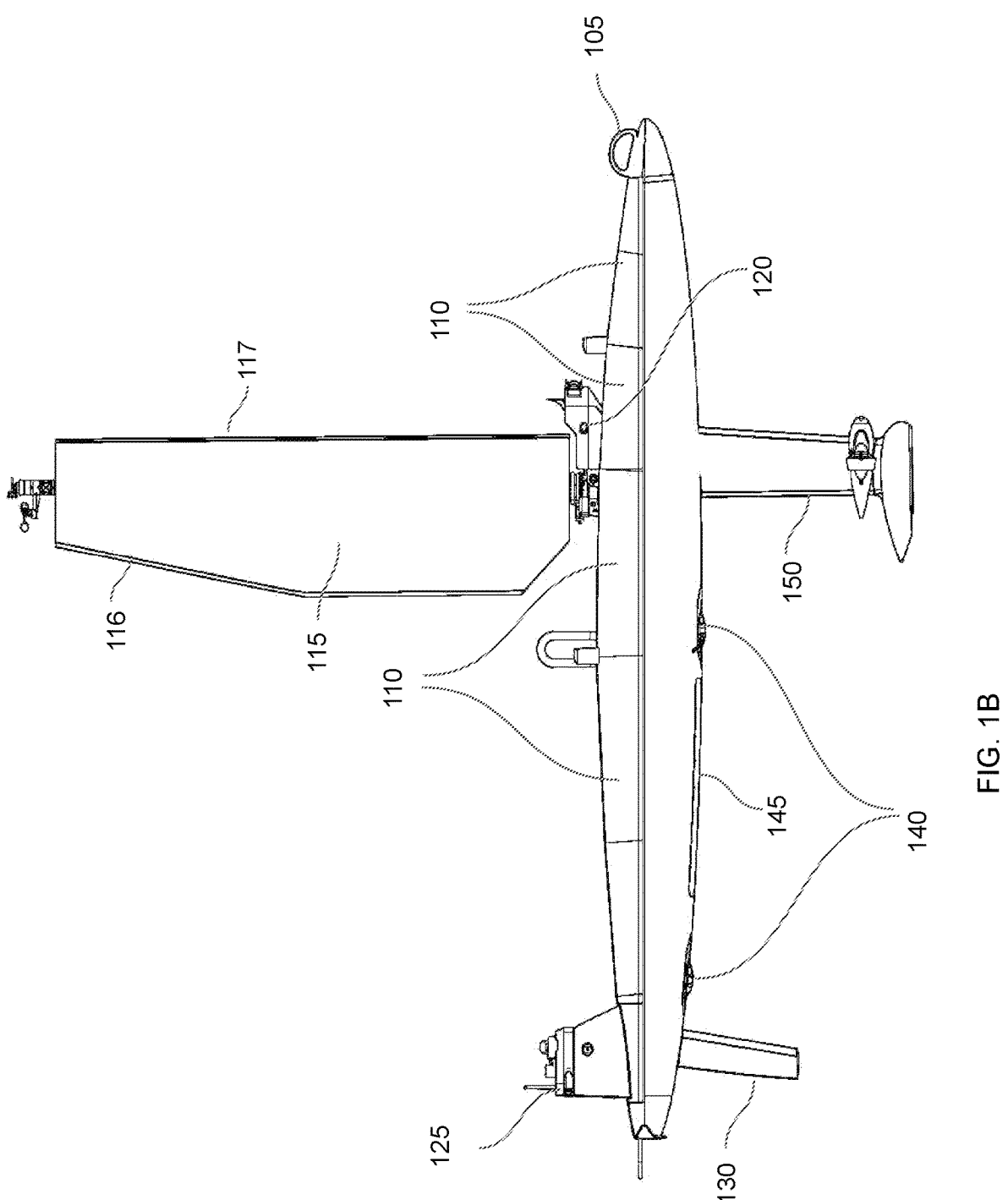

Turning now to FIGS. 1A-B, diagrams of an exemplary UMV 100 that includes obstacle detection and avoidance according to aspects of the present disclosure are shown. UMV 100 may be used for sea going research, commercial equipment monitoring, and military activities as well as many other purposes that require a small maritime vehicle that can operate both on the surface as well as below the surface of the water. As an example, the hull of UMV 100, without external elements may measure 14.0 feet in length, 2.0 feet in height, and 2.7 feet in width. UMV 100 is generally configured to operate unmanned and include the capability to observe its surroundings and environment using a plurality of sensors. UMV 100 may also include the capability to process the data from the plurality of sensors in order to further generate a response to its surroundings and environment, such as maneuvering the UMV 100.

For purposes of reference, FIG. 1A shows a view from the right side, or starboard side, of UMV 100 with a moveable element shown in a fully retracted or down position. FIG. 1B shows a view from the right side, or starboard side, of UMV 100 with the moveable element shown in a fully extended or up position. It is important to note that not all of the elements of UMV 100 may be shown in each of FIGS. 1A-1B. However, when an element of UMV 100 is shown in more than one of FIGS. 1A-1B, the same reference number is used.

UMV 100 includes a bow capture point 105, also referred to as a tow point, attached to the upper surface of the hull at the bow of UMV 100. The bow capture point 105 allows UMV 100 to be pulled or towed behind another watercraft in the event UMV 100 can no longer propel itself or may be used during servicing. The bow capture point 105 further allows the UMV 100 to be stabilized or tethered as a part of a docking procedure. UMV 100 further includes a plurality of solar panels 110 positioned on the center section of the upper surface of the hull between the bow and stern of UMV 100. The solar panels 110 may be used for operating UMV 100 when it is on the surface of the water. The solar panels 110 are further used to recharge the energy storage system (e.g., a set of batteries) used primarily for operating UMV 100 when it is below the surface of the water. Four solar panels 110 are shown in FIGS. 1A and 1B. In other embodiments, more or fewer than four solar panels may be used and one or more of the solar panels may be placed at locations other than those shown.

UMV 100 additionally includes a payload wing 115. Payload wing 115 is movable depending on its use and the position of the UMV within the water. For instance, payload wing 115 may be positioned in an extended, or up, position, much like a sail on a sailboat, when UMV 100 is on the surface of the water. As such, the payload wing 115 may operate as a sail to provide a wind driven mode of propulsion for UMV 100. Further, payload wing 115 may be positioned in a retracted, or down, position when UMV 100 is either not using the payload wing 115 as a sail or under the surface of the water. When under the surface of the water, the retracted payload wing 115 may act as a stabilizer element, similar to a submarine. In some embodiments, all or a portion of payload wing 115 may include solar panels that can operate in conjunction with, and in a manner similar to, solar panels 110 described above. The movement of payload wing 115 is controlled through a mechanism included in wing housing 120. The wing housing 120 also includes a mechanism to allow payload wing 115 to rotate when in the extended position. For example, FIG. 1A shows a contoured edge 116 of payload wing 115 extending above UMV 100 in its retracted position while FIG. 1B shows contoured edge 116 towards the bow of UMV 100 with a straight edge 117 (not shown in FIG. 1A) towards the stern when payload wing 115 is extended, indicating that payload wing 115 has been rotated 180 degrees relative to its orientation in FIG. 1A.

The wing housing 120 may also include one or more image sensors, such as cameras, for capturing image data of the surroundings around the front and/or sides of UMV 100. The payload wing 115 may further include one or more solar panels that are used in a manner similar to that described above when the payload wing 115 is in the extended position. In some embodiments, the upper surface of the hull of UMV 100 may include a recess or slot (not shown), allowing the straight edge 117 of payload wing 115 to be positioned and retained within the recess or slot when in the retracted position.

A conning tower 125 is located near the stern or aft portion of UMV 100. The conning tower 125 may include one or more sensors associated with operation of UMV 100 including, but not limited to image sensors, automatic identification system (AIS) sensors, and LiDaR sensors. These sensors may be included within conning tower 125 and/or externally attached to it. Further, one or more image sensors, such as cameras, may be attached to conning tower 125 for capturing image data of the surroundings around the back and/or sides of UMV 100. In some embodiments, the conning tower 125 may have an opening (not shown) that is inline with the recess or slot and used for retaining the payload wing 115 when in retracted or down position in a manner similar to that described above. The opening may, in some cases, continue completely through conning 125, spitting conning tower 125 into two halves.

UMV 100 also includes a rudder 130, located near the stern, that may be used for steering UMV 100 when UMV 100 is on the surface as well as below the surface of the water. Thrusters 140 are located on the bottom surface of the UMV 100 and used to propel UMV 100 in a forward and/or reverse direction when UMV 100 is on the surface as well as below the surface of the water. The thrusters 140 are shown in FIGS. 1A and 1B as deployable thrusters. In other embodiments, different types of thrusters and/or propulsion mechanisms may be used. Further, FIGS. 1A and 1B show two thrusters 140 positioned near the stern and near the center of the bottom surface of UMV 100. In other embodiments, more or fewer thrusters may be included and/or located in other places on the UMV.

A payload bay 145 is located within the hull of the UMV 100, that is accessible through a panel between the thrusters 140 along the bottom surface of the UMV 100. The payload bay 145 is used for storing the electronic systems that are used as part of the operation and control of UMV 100. The payload bay 145 may be accessed by removing the panel, typically when the UMV 100 is removed from the water, or in dry dock as part of servicing. The UMV 100 further includes a payload keel 150 which is used to stabilize UMV 100 particularly when on the surface of the water and/or when the payload wing 115 is in the extended position. As shown in FIGS. 1A and 1B, payload keel 150 is a bulb type keel, but in other embodiments, a different type of keel may be used. The payload keel 150 may include one or more sensors associated with operation of the UMV 100 including, but not limited to, depth ranging sensors and SONAR sensors. These sensors may be included within payload keel 150 and/or externally attached to it.

It is worth noting that the UMV 100 may include additional components that are either not shown in FIGS. 1A-1B or not described herein in the interest of conciseness as these components are well known to those skilled in the art. These components may include, but are not limited to, additional vertical and/or horizontal stabilizer surfaces or fins, additional attachment or capture points, ballast mechanisms, and the like.

As part of its operation, UMV 100 can be configured to detect and avoid an object in the vicinity that may be identified as an obstacle posing a threat of a collision based on the current movement and direction of UMV 100. An image sensor on the UMV 100 captures a video image containing at least one object that has been identified as an obstacle. The electronic systems in the UMV 100 determine if the object is associated with, or classified into, an object class of a set of predetermined object classes. If the object is associated with, or classified into, an object class, the electronic systems in the UMV 100 determine the distance between the UMV 100 and the object based on the height of the object as displayed in the video image and the mean height of the object class. Once the distance is determined, the electronic systems can adjust the navigational control of UMV 100 to travel in an adjusted direction. Additional information about the operation of the electronic systems used for obstacle detection and avoidance will be described in further detail below.

It is worth noting that in some embodiments all objects that are detected may be identified as obstacles. Some types of sensors, such as SONAR and LiDaR, may not be capable of distinguishing between an object that is an obstacle and an object that is not. Further, some image sensors may not provide an image with enough resolution to accurately distinguish whether an object can be identified as an obstacle or not. As a result, all objects may be identified as obstacles in order to prevent an unexpected and unnecessary collision risk.

In some embodiments, image sensors, such as those used on UMV 100 and described herein, provide an image with a high enough resolution to accurately distinguish whether an object is an obstacle is to be identified as an obstacle or not. More specifically, the operation of UMV 100 may require that an object must be detected and identified as an obstacle before it can be associated with, or classified into, an object class. For example, birds and fish, when detected, may not be identified as obstacles and will not require avoidance because they will move out of the way and pose little threat to UMV 100 and will not pose a threat to UMV 100. Table 1 provides an example list of objects that can be detected and whether the object is identified as an obstacle.

TABLE 1

| Object | Obstacle (Y or N) |
| --- | --- |
| UMV | Y |
| boat | Y |
| breakwater | Y |
| buoy | Y |
| crane | Y |
| dock | Y |
| jet ski | Y |
| marine obstacles | Y |
| person | Y |
| pier | Y |
| piling | Y |
| sailboat | Y |
| seawall | Y |
| channel marker | Y |
| ship | Y |
| bird | N |
| animal | N |
| fish | N |

In some embodiments, the detection performance of some sensors, including SONAR and LiDaR sensors as well as low resolution image sensors may be improved by utilizing data processing techniques such as clustering. Clustering is a data mining technique that identifies objects from point data. Outlier points and other points that do not have an adequate number of hits may be ignored. For example, a cluster may require a minimum of three hits to be considered an obstacle.

Figure 2:
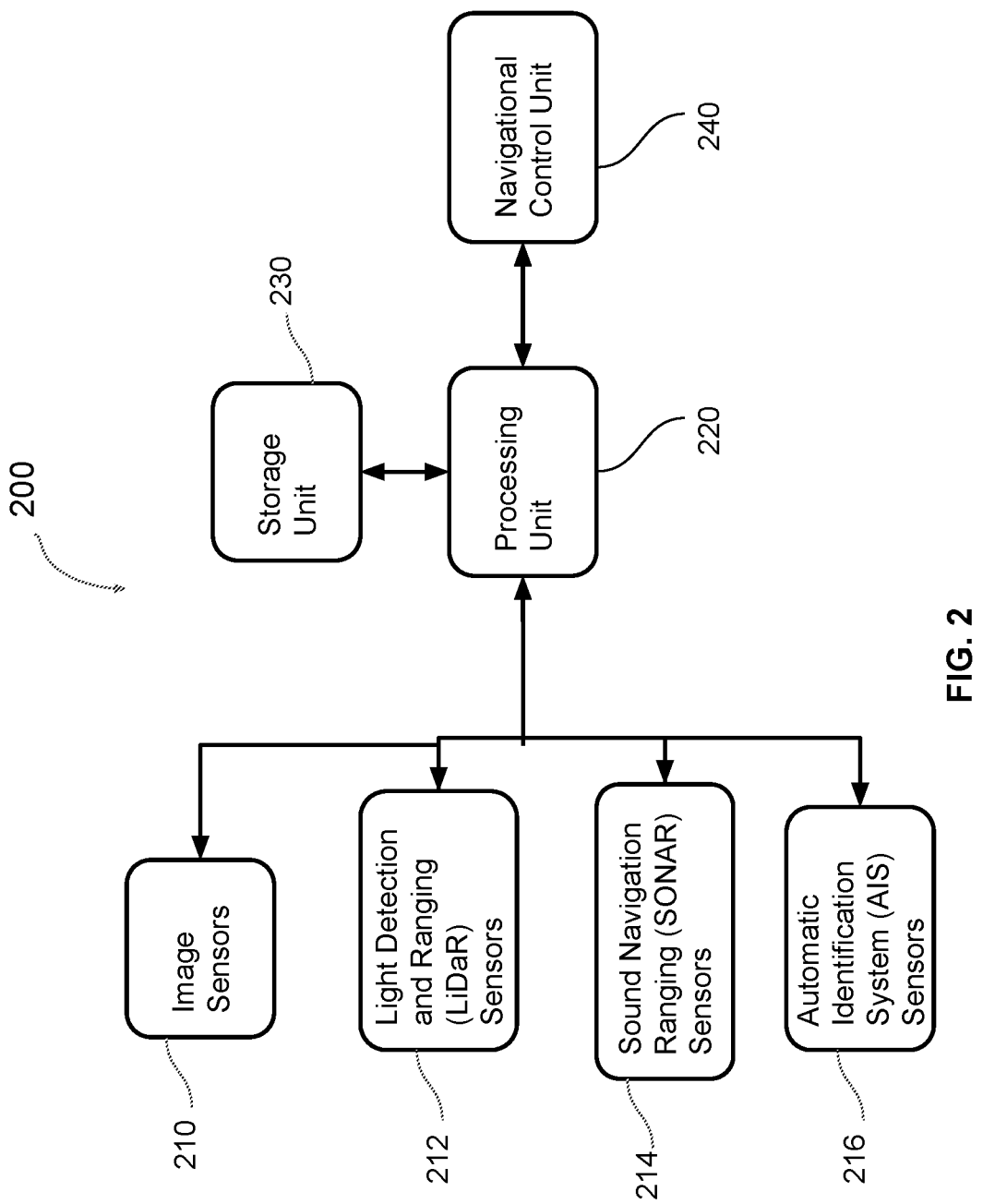
FIG. 2 is a block diagram of an exemplary system used for obstacle detection and avoidance according to aspects of present disclosure.

FIG. 2 illustrates a block diagram of an exemplary system 200 used for obstacle detection and avoidance according to aspects of present disclosure. System 200 may be included as part of a UMV, such as UMV 100 described above. System 200, or a system similar to system 200 may also be included as part of other UMVs or marine craft that require operations that include collision avoidance. In system 200, data inputs including information associated with the environment around the UMV is provided to a set of sensors 210-216. The set of sensors 210-216 include image sensors 210, LiDaR sensors 212, sound SONAR sensors 214, and automatic identification system (AIS) sensors 216. The set of sensors 210-216 are coupled to a processing unit 220. Processing unit 220 is further coupled to a storage unit 230 and a navigational control unit 240. The navigational control unit 240 provides control signals to the propulsion and steering elements included in the UMV. It is worth noting that system 200 may include additional components, including additional and/or different types of sensors. These additional components are not shown here in the interest of conciseness as these components are well known to those skilled in the art.

Image sensors 210 capture visual images using an array of light wavelength sensor elements. One or more of the image sensors 210 may include a lensing structure that can allow for greater resolution of the captured image within a focal range and field of view (FOV). One or more of the sensors 210 may provide the visual images as individual images or as part of a video stream. The video images may be processed and provided in any one of the standardized image or video stream formats. The image standard used may include, but is not limited to, joint photographic experts group (JPEG), JPEG 2000, portable network graphics (PNG), and the like. The video stream format used may include, but is not limited to, motion picture experts group (MPEG) standards MPEG-2, MPEG-4, MPEG-H, video processor (VP) standards VP and VP9, and the like. Further, one or more of the image sensors 210 may capture visual images on a slower periodic basis, such as every 60 seconds, while other image sensors may capture visual images in a more continuous manner to form a video image stream. Examples of image sensors 210 include, but are not limited to, Numurus 3DX-C-1K, Sidus SS474 with a 102 degree FOV, Sidus SS400 with a 92 degree FOV, and the like.

LiDaR sensors 212 use time measurements of the reflections of laser beam pulses to calculate distances and form 3D topographical images showing limited features of objects. LiDAR sensors 212 may use a very high pulse repetition rate for the laser beam in order to maintain high accuracy and detection of small objects. LiDaR sensors 212 may operate in a fixed direction or may scan multiple directions, often referred to as LIDaR scanning. LiDaR sensor 212 may also be more sensitive to the movement of objects than other imaging technologies such as image sensors, SONAR sensors, and radio detection and ranging (RADAR) sensors, making it useful for object detection and tracking. Examples of LiDaR sensors 212 include, but are not limited to, Velodyne HDL-32E, RIEGL VUX-1UAV, and the like.

SONAR sensors 214 use time measurements of reflections of audio frequency pulses, referred to as pings, to detect features that may indicate the presence of objects and calculate distances to those objects. Generally, SONAR sensors 214 are used to detect objects under the surface of the water but may also be used to detect objects on the surface of the water, particularly if a portion of the object is below the surface. One or more of the SONAR sensors 214 may operate using either low frequencies (e.g., 50 kilohertz (KHz) or 83 KHZ) or high frequencies (e.g., 200 KHz). In some cases, one or more of the SONAR sensors 214 may operate using both low and high frequencies, referred to as a broadband SONAR sensor. High frequencies typically yield the better resolution while low frequencies can reach greater underwater depths. Further, one or more of the SONAR sensors 214 may be single point sensors that can identify an object as a point along line, two-dimensional (2D) scanning sensors that can identify an object as multiple points along a plane, and/or three-dimensional (3D) point cloud sensors that can identify an object as points within a 3D space. Examples of SONAR sensors 214 include, but are not limited to, Echologger ETH400, Lowrance S3100, Furuno Dff3d, and the like.

AIS sensors 216 are used as part of a maritime tracking that employs a common protocol as part of a primary collision avoidance system. AIS sensors 216 may include the ability to transmit information associated with the UMV on which it is used to other maritime craft (e.g., boats, ships, etc.), including, but not limited to, a unique identification, position, course, and/or speed. AIS sensors 216 may further include the ability to receive similar information from other maritime craft. Examples of AIS sensors 216 include, but are not limited to, Allek Marine amino 108, Raymarine AIS700, and the like.

Processing unit 220 includes one or more processors or processing devices that manage all or a portion of the operations of the unmanned marine craft (e.g., UMV 100 in FIG. 1). In particular processing unit 220 may be configured to run a process that can detect and avoid obstacles as part of autonomously navigating the unmanned marine craft in the water using information from one or more of image sensors 210, LiDaR sensors 212, SONAR sensors 214, and AIS sensors 216. Processing 220 may further provide control information to the navigational control unit 240 as a result of the information from the sensor or other navigational instructions provided to processing unit 220. Processing unit 220 may also receive information, such as navigational instructions or data, from sources external to system 200, or to the unmanned marine craft. Processing unit 220 may additionally transmit information, such as operating conditions of the unmanned marine craft, to those external sources. Information regarding the process of detecting and avoiding obstacles will be described in further detail below.

Storage unit 230 serves as storage for applications, programs, and control code used by processing unit 220 as well as data information, such as visual or topographical images generated by image sensors 210, LiDaR sensors 212, and SONAR sensors 214. Storage unit 230 may also store information associated with the process of detecting and avoiding obstacles as part of autonomously navigating the unmanned marine craft (e.g., UMV 100) in the water, such as object class databases and characteristics of types of sensors. Storage unit 230 may include one or more of the following storage elements including, but not limited to, random access memory (RAM), read only memory (ROM), Electrically-Erasable Programmable ROM (EEPROM), and flash memory. Storage unit 230 may also encompass one or more integrated memory elements including, but not limited to, magnetic media hard disk drives and optical media disk drives.

Navigational control unit 240 receives a control signal from the processing unit 220 containing information associated with the navigational movements for the UMV (e.g., UMV 100 in FIG. 1). The navigational control unit 240 processes the information and provides specific control signals or commands to the various navigational elements included on the UMV. Navigational control unit 240 may include one or more processors specifically configured for processing the information received and providing control signals using the required electrical and mechanical interfaces to the navigation elements. For example, navigational control unit 240 may command propulsion elements (e.g., thrusters 240) to propel the UMV forward at a certain speed (e.g., 4 knots) based on information provided by processing unit 220. In another example, navigational control unit 240 may command the steering elements (e.g., rudder 130) to steer the UMV forward in a certain direction (e.g., 10 degrees to the starboard) based on information provided by processing unit 220. In yet another example, navigational control unit 240 may command the sail controller (e.g., wing housing 120) to raise the sail (e.g., payload wing 115) to operate the UMV using wind power based on information provided by processing unit 220.

It is worth noting that, in some embodiments, the processing unit 220 and the navigational control 240 unit may be combined into a single unit since some of the components in each are common between them. Further, system 200 may include other elements, including other sensors and communication devices, not shown or described in FIG. 2 in the interest of conciseness. These elements may include, but are not limited to, RADAR sensors, inertial navigation systems (INS), global position systems (GPS), doppler velocity logs (DVL), altimeters, and the like.

In operation, system 200 is configured to implement a heuristic navigational and control algorithm utilizing real-time data from on-board sensors and predetermined data to detect and avoid an object identified as an obstacle for the navigational course of a UMV (e.g., UMV 100 in FIG. 1) As part of the algorithm, a one or more of the image sensors 210 generate a video image and provide the video image to the processing unit 220. The video image contains an object that has been identified as an obstacle. Processing unit 220 determines if the object displayed in the video image is associated with an object class from a set of predetermined object classes that may be stored in storage unit 230. If the object is associated with an object class, a value for the mean height of the object class is retrieved by the processing unit 220 from the storage unit 230. The processing unit 220 further determines a distance between the UMV and the object based on a height of the object as displayed in the video image and the mean height for the object class. The distance that is determined may be multidimensional and include linear distances in multiple planes (e.g., x, y, z). The distance may also be expressed as a linear distance and one or more angular orientations, such a cylindrical or polar vector.

Based on the determined distance, the processing unit 220 sends instructions to the navigational control unit 240 to adjust the navigational control of the UMV and change the navigational course of the UMV based on the determined distance. The instructions may include no change to the previous navigational course or may include instructions from the processor 220 to navigational control unit 240 may include an instruction to generate an appropriate navigational response by one or more of the navigational elements described above that is an appropriate response to avoid the obstacle. Further, since the determined distance may be multidimensional, the appropriate navigational response may include a response in more than one directional plane. For example, the navigational response may be an evasive maneuver to steer to the starboard/port and/or submerge.

In some embodiments, processing unit 220 may utilize one or more machine learning algorithms as part of determining the object for the object displayed in the video. Further, in some embodiments, machine learning algorithms may be used to further classify and/or characterize the object displayed in the video image if the object is not determined to be associated with any of the objects from the set of predetermined object classes. In some cases, the classification and/or characterization may be used to generate a new object class that may be stored for future reference and/or added to the set.

In some embodiments, data may be generated by other sensors, such as LiDaR sensors 212, and SONAR sensors 214, and used as part of the heuristic navigational control algorithm. These sensors may not be as capable at detecting the object and associating the object with an object class in a manner as described for the image sensors, but may be able to provide additional information associated with the distance between the between the UMV and the object displayed in the video image and may be used to determine a relative bearing and range for the object. This data may include, for example, a direct measurement of distance or range based on LiDaR or SONAR reflections off of an object.

Further, in some embodiments, the use of data from multiple types of sensors may provide correlation of the object class as well as the distance between the UMV and the object displayed in the video image. As an example, one or more of the SONAR sensors 214 may generate data associated with a measured time of reflection to an object in the vicinity of the UMV and provide the data to processing unit 220. Processing unit 220 may use the data and calculate a distance between the UMV and the object in the vicinity using well known conversion calculations. Processing unit 220 may further compare the distance between the UMV and the object in the vicinity to the determined distance between the UMV and the object displayed in the received video image to determine, for instance, if they are the same object and/or if a correction to the distance or a parameter of the object class is needed.

It is important to note that the heuristic navigational control algorithm will normally continue to be in operation as long as the UMV is moving on a navigational course. As such, processing unit 220 may continually receive and process data from the image sensors 210 provide instructions to the navigational unit 240 as needed in the manner described above.

Further, in some embodiments, the use of data from multiple types of sensors may be employed to establish an order of precedence and/or importance for the data received by the processing unit 220 from those sensors. For example, sensor data from the surrounding areas forward of the UMV may take precedence as they are most likely to detect objects that will require a change to the navigational course of the UMV. Further detection of an object multiple times by multiple types of sensors may also take a higher precedence. For example, an object detection count may be maintained, and precedence may be raised based on a threshold value for the object detection count. The object detection count may be queried periodically over a set time interval, for example, five seconds.

Figure 3:
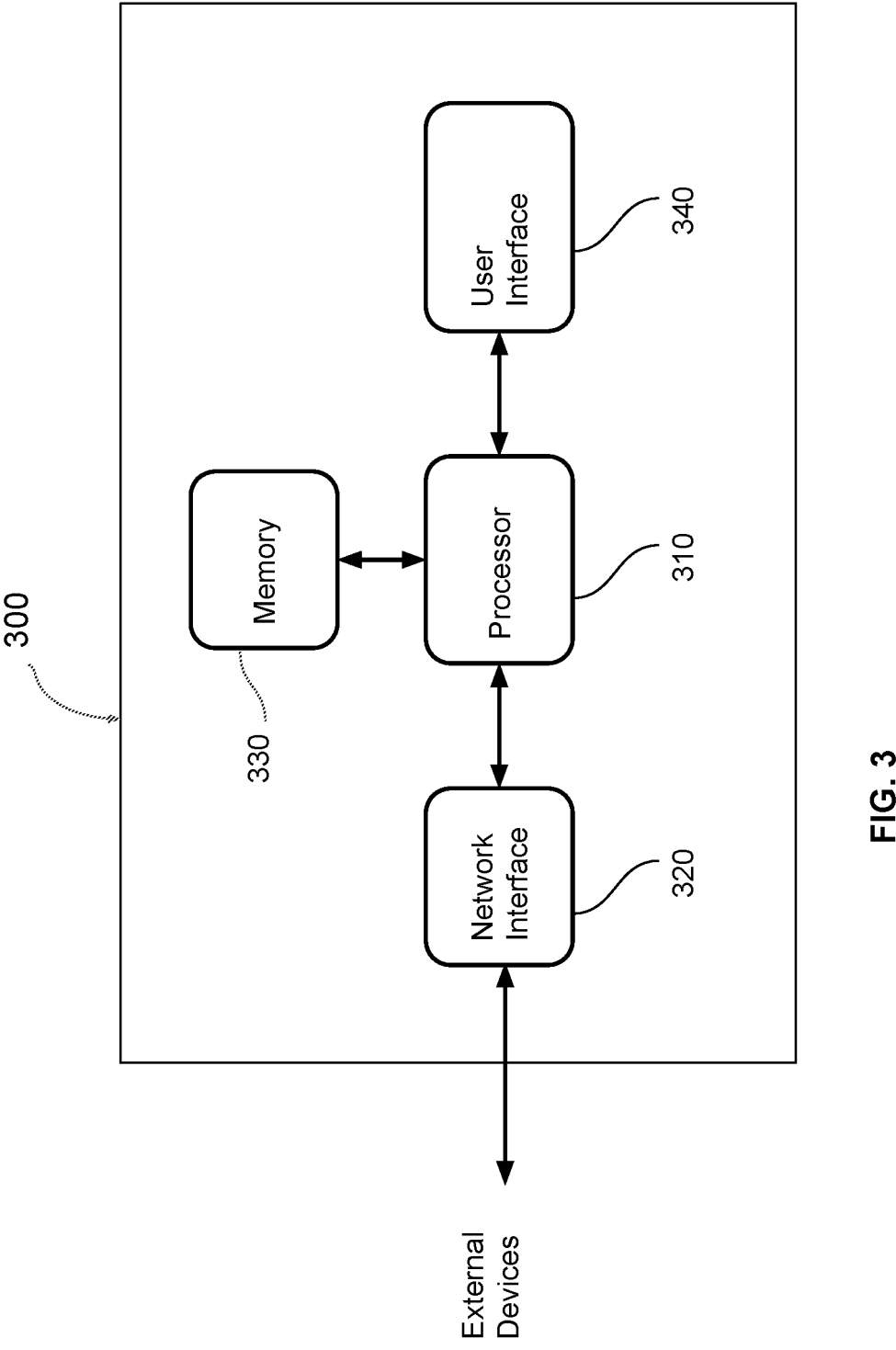
FIG. 3 is a block diagram of an exemplary processing device used in a system for obstacle detection and avoidance according to aspects of the present disclosure.

FIG. 3 illustrates a block diagram of an exemplary processing device 300 used in a system for obstacle detection and avoidance according to aspects of the present disclosure. Processing device 300 may operate in a manner similar to that described above for processing unit 200 as part of system 200 described in FIG. 2. Processing device 300 may also communicate with one or more components external to the system and/or a vehicle (e.g., UMV 100 described in FIG. 1). For example, processing device 300 may transmit and receive data over a communication network with a central command center or station that is responsible for monitoring and/or operating UMVs such as UMV 100. Processing device 300 includes a processor 310. Processor 310 is coupled to network interface 320 that communicates with other components external to processing device 300, such as sensors 210-216, storage unit 230 and/or navigational control unit 240. Processor 310 is further coupled to memory 330 and user interface 340. It is worth noting that several elements and/or interconnections necessary for complete operation of processing device 300, either as a standalone device or incorporated as part of another device, are not shown in the interest of conciseness, as the elements not shown are well known to those skilled in the art.

Network interface 320 includes circuitry to perform network transmission functions on a signal provided to the communication network from processing device 300 as well as signal reception functions on a signal provided from the communication network to processing device 300. Network interface 320 may also include circuitry to convert the signal provided by processor 310 into a network compliant signal for transmission over the communication network and to convert a signal received from the communication network into a signal that can be provided to processor 310. Examples of communication protocols that may be used with network interface 320 include, but are not limited to, the Institute of Electrical and Electronics Engineers (IEEE) standard 802.3, otherwise referred to as ethernet, IEEE standard 802.11, otherwise known as Wi-Fi, and other communication protocols that provide similar connectivity aspects. Network interface 320 also includes an interface connector suitable for the type of media that is used for transporting or communicating the signals between processing device 300 and the network. The interface connector may include, but is not limited to, a F-type coaxial connector, a ST type optical connector, a registered jack (RJ) type RJ-11 or RJ-45 connector, a mechanical transfer registered jack (MT-RJ) type connector, and the like. Network interface 320 may also be configured to couple to one or more antennas that may be configured for use with wireless communication operation external to the system or the UMV (e.g., UMV 100 described in FIG. 1) as described earlier.

Processor 310 may be a programmable microprocessor that is reconfigurable with downloadable instructions or software code stored in memory 330. Processor 310 may alternatively be a specifically programmed controller and data processor with internal control code for controlling, managing, and processing all functions and data in processing device 300. More specifically, processor 310 may be configured to operate an artificial intelligence (AI) inferencing and detection system that is used as part of controlling a UMV (e.g., UMV 100 in FIG. 1) to avoid obstacles. It is worth noting that processor 310 may be embodied as more than one processing device that operates cooperatively as a way to improve the overall operational performance of processor 310. Examples of processors that may be used as processor 310 include, but are not limited to, NVidia Jetson Orin, NVidia Jetson Xavier, and the like.

Memory 330 stores instructions and control software used by processor 310 as part of processing data, such as the data received from sensors (e.g., sensors 210-216 described in FIG. 2). Memory 330 may also store some of the received data for later processing, and also store processed data as needed and/or prior to delivery to other devices, such as storage unit 230 or navigational control unit 240. Examples of components that may be used for memory 220 include, but are not limited to, random access memory (RAM), read only memory (ROM), Electrically-Erasable Programmable ROM (EEPROM), and flash memory. System memory 330 may also encompass one or more integrated memory elements including, but not limited to, magnetic media hard disk drives and optical media disk drives.

User interface 340 provides a mechanism for receiving inputs from a user in order to facilitate control and operation of processing device 300. User interface 340 may include a user input or entry mechanism, such as a set of buttons, a keyboard, or a microphone. User interface 340 may also include circuitry for converting user input signals into a data communication format to provide to processor 310. User interface 340 may further include some form of user notification mechanism to show device functionality or status, such as indicator lights, or small display. User interface 340 may also include circuitry for converting data received from processor 310 into signals that may be used to operate the user notification mechanism.

In operation, Processor 310 retrieves from memory 330 the program instructions or software code needed to configure processor 310 to perform obstacle detection and avoidance in the following manner. Data in the form of a video image from one or more of the image sensors (e.g., image sensors 210 in FIG. 2) is received over a communication network by network interface 320. The video image may be provided from the sensor, either as an individual image or as part of a video stream, over network connection using a real time streaming protocol (RTSP). The video image contains an object that is in the vicinity of the system or UMV (e.g., UMV 100 in FIG. 1). The network interface 320 provides the video image containing the object to processor 310. Processor 310 determines if the object is associated with one of the object classes in a set of predetermined object classes. The set or list of predetermined object classes may be retrieved from memory 330 or from another storage element external to processing device 300 (e.g., storage unit 230) through network interface 320. An exemplary set of object classes is shown in table 2 below:

TABLE 2

```
"classes": {
    "boat",
    "beach",
    "boat",
    "Triton",
    "sky".
    "warship",
    "buoy",
    "dock",
    "channel marker",
    "water",
    "bird",
    "breakwater",
    "sailboat",
    "marine-obstacles",
    "person",
    "lighthouse",
    "airplane",
    "bridge",
    "ship"
}
```

If it is determined that the object is associated with one of the object classes from the set of predetermined object classes, then processor 310 accesses the value for the mean height for objects in the object class that has been associated with the object. The mean height may be accessed by retrieving the value from memory 330 where it may be stored with the object class or may be retrieved from an external storage element as described above. An exemplary set of mean heights and their associated object class is shown in table 3 below:

TABLE 3

| Class | Mean Height |
| --- | --- |
| Boat | 2 meters |
| Ship | 22 meters |
| Person | 1.7 meters |
| Sailboat | 9 meters |
| Dock | 5 meters |
| Breakwater | 3 meters |
| Other | 1 meter |

It is worth noting that, in the present embodiments, a mean height value is utilized rather than a different measurement characteristic, such as width. On the water the height of an object is typically a more consistent factor. In general, the length of an object, such as a boat or ship, can vary significantly more than the height. In other embodiments, a different measurement characteristic, such as mean width, may be used.

Processor 310 also determines the distance between the UMV and the object that is associated with one of the object classes based on a height of the object as displayed or rendered in the received video image and the mean height for the object class. The distance that is determined may be multidimensional as described above. In some embodiments, as part of determining the distance, processor 310 may access information about the sensor(s) that generated the received video image. The information may include, but is not limited to, position of the image sensor on the UMV, field of view of the image sensor, focal length of the sensor, and pixel count of the image sensor. The information about the sensor(s) may be retrieved from either memory 330 or from an external storage element as described above.

In some embodiments, the determination of the distance between the UMV and the object that is associated with one of the object classes may include calculating the distance as a ratio of the mean height of the object class and the height, in vertical pixels, of the at least one object as displayed in the video image. The height, in vertical pixels, may be determined from information associated with the sensor that generated the video image as described above. An example of an equation illustrating this ratio is shown below:

distance = (f * real height * image height) / (object height * sensor height)
where:
distance = distance from object to image sensor
  (Based on mounting at a specified location and orientation on the UMV)
f = the focal distance of the camera
real height = estimate of the object height based on mean height of object class
image height = height of total image in pixels
object height = number of vertical pixels the object occupies in the video image
sensor height = height, in pixel, of the sensor element in the image sensor Processor 310 further generates a control signal as part of an adjustment to the navigational control of the UMV based on the determined distance between the UMV and the object associated with one of the object classes. The control signal may include one or more of a change in direction, a change in depth, and a change in speed for UMV. The control signal is provided to a navigational control unit (e.g., navigational control unit 240) over the communication network through network interface 320 to adjust the direction, depth, and/or speed in order to avoid the object identified as an obstacle from the received video image.

Figure 4:
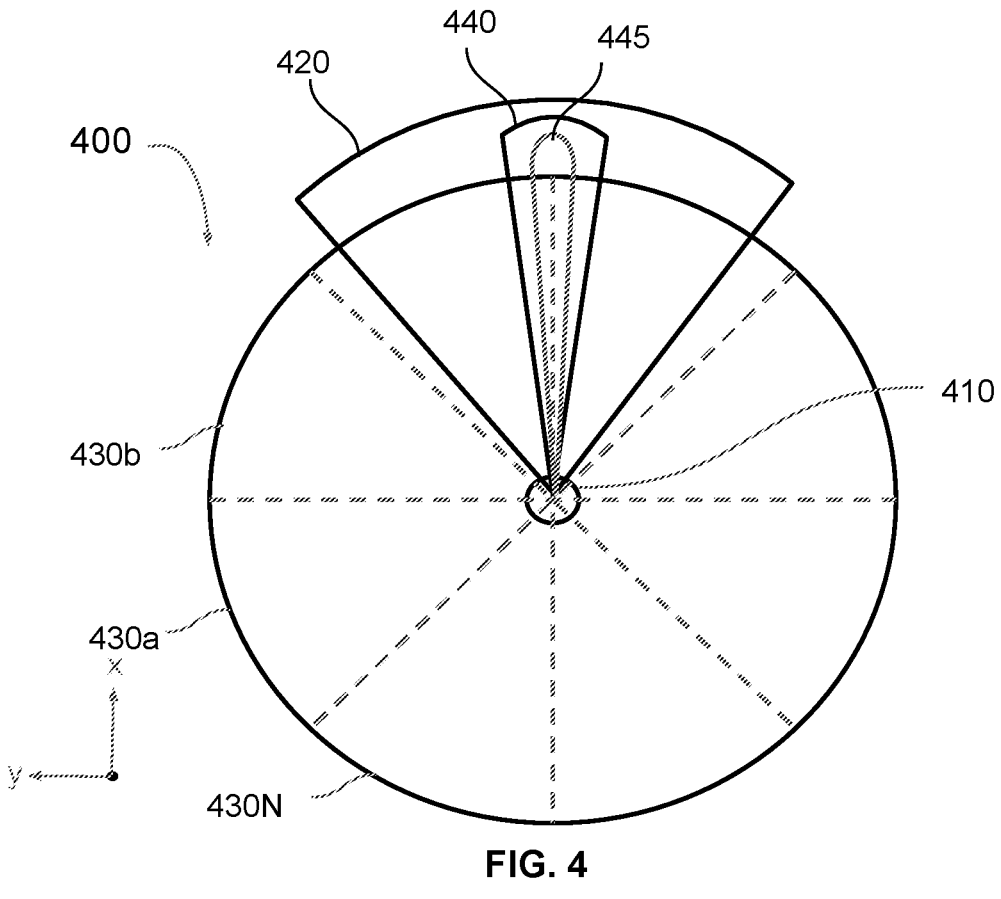
FIG. 4 is an exemplary diagram illustrating the detection zones of a set of different types of sensors that can be used as part obstacle detection and avoidance in a UMV according to aspects of the present disclosure.

FIG. 4 is an exemplary diagram illustrating the detection zones of a set of different types of sensors that can be used as part of obstacle detection and avoidance in a UMV according to aspects of the present disclosure. FIG. 4 specifically illustrates the overlap of the detection zones with respect to a UMV 410, that is similar to UMV 100 described in FIG. 1. The detection zones shown are with respect to a single sensor of each type in a stationary position and common orientation on UMV 410. An orientation axis is shown with x and y on the planar surface of the page and z oriented upward from the surface of the page with the page. UMV 410 is shown from a top view and oriented such that its bow is in the x direction. FIG. 4 illustrates the range of detection in the horizontal plane at the surface of the water with respect to UMV 410 and the range of detection in other planes (e.g., the vertical plane) both above and below the surface of the water may be different. It is worth noting that, in other embodiments, the ranges of the detection zones for each type of sensor may vary from what is shown in FIG. 4.

In FIG. 4, zone 420 represents the range of detection for an image sensor, such as one of image sensors 210 described above. The angular width and range of zone for the image sensor is larger than any of the other sensors described in FIG. 4, providing earlier detection capability. Further, using only a few additional image sensors oriented in different directions can result in complete coverage around UMV 410 as will be described below. Zones 430*a*-N represents the range of detection for an image sensor, such as one of image sensors 210 described above. In this case, each of the zones 430*a*-N represent a single range as part of a scanning LiDaR sensor capable of detecting around a complete 360 degree circumference. The number of zones N may depend on the type of laser beam used for the detection.

Zone 440 and zone 445 represent the range of detection for a low frequency SONAR sensor and a high frequency SONAR, such as one or more of SONAR sensors 230 described above, respectively. It is worth noting that the angular width and range of the high frequency sensor is less than that of the low frequency sensor. In some embodiments, the same SONAR low frequency and/or high frequency sensor can be automatically repositioned to increase the circumferential range of detection, up to and including a 360-degree circumference. It is worth noting that while each of the zones 420, 430, 440, and 445 are shown with respect to the x-y plane, the zones may also extend in the z-direction (not shown).

Figure 5:
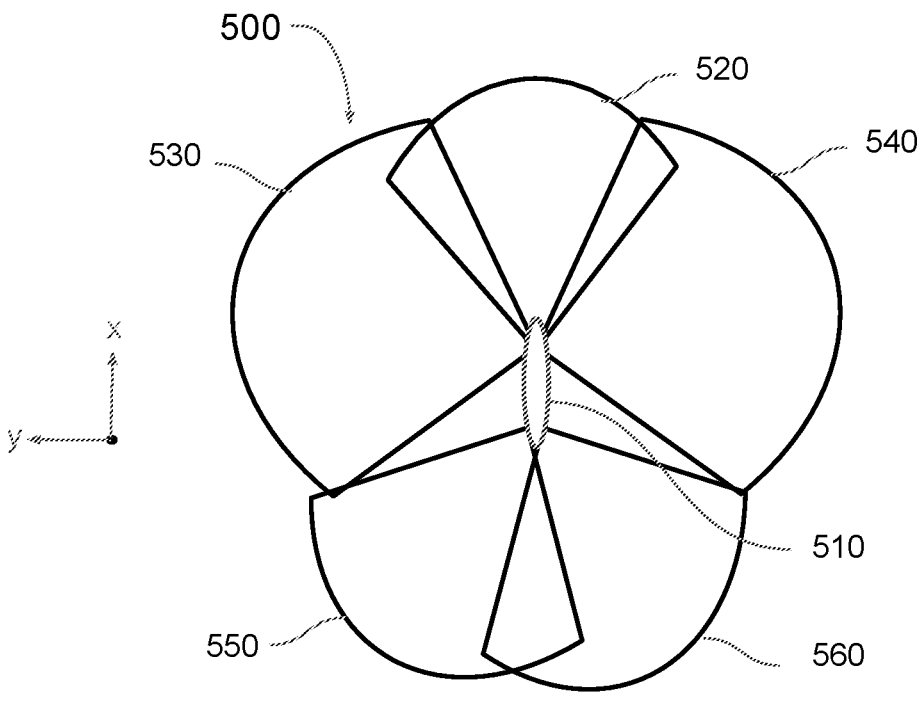
FIG. 5 is an exemplary diagram illustrating the detection zones of a set of images sensors that can be used as part obstacle detection and avoidance in a UMV according to aspects of the present disclosure.

FIG. 5 is an exemplary diagram illustrating the detection zones of a set of image sensors that can be used as part of obstacle detection and avoidance in a UMV according to aspects of the present disclosure. FIG. 5 specifically illustrates the overlap of the detection zones of a set of image sensors oriented in different directions with respect to a UMV 510, same as UMV 410 described in FIG. 4. An orientation axis is shown with x and y on the planar surface of the page and z oriented upward from the surface of the page with the page. UMV 510 is shown from a top view and oriented such that its bow is in the x direction. Each of the detection zones are shown with respect to the position of one of the image sensors on UMV 510 based on its orientation. For example, five detection zones are shown associated with five image sensors. Detection zones 520, 530, and 540 are shown originating from the bow of UMV 510, such as wing housing 120. Detection zones 550 and 560 are shown originating from the aft of UMV 510, such as conning tower 125. The aggregation of the five detection zones represents a detection area representing a complete 360-degree circumference around UMV 510. FIG. 5 illustrates the detection zones in the horizontal plane at the surface of the water with respect to UMV 410 and the range of detection in other planes (e.g., the vertical plane) both above and below the surface of the water may be different. It is worth noting that, in other embodiments, the ranges of the detection zones for each of the image sensors may vary from what is shown in FIG. 5. Also, in other embodiments, other positions and orientations for the image sensors, along with the more or fewer image sensors, may be used to create different patterns of detection zones.

In FIG. 5, detection zone 520 represents the range of detection or view for an image sensor in a forward direction from the bow of UMV 510. The image sensor used for detection zone 520 has a higher resolution within the field of view than the other image sensors along with a more limited angle of view (e.g., 90 degrees). Detection zones 530 and 540 represent the range of detection or view for image sensors in directions along the port and starboard sides of UMV 510, respectively. The image sensors used for detection zones 530 and 540 are preferably the same type and/or model and will have a wider angle of view than the other image sensors (e.g., 100-120 degrees). As shown, detection zone 520 has a small overlap region with detection zones 530 and 540. Further, based on the position of the image sensors (e.g., on wing housing 120), the detection zones 520, 530, and 540 can cover all of the forward area in the vicinity of UMV 510, leaving no "dead zone" or region that is not within a detection zone. Detection zones 550 and 560 represent the range of detection or view for image sensors in the rearward direction along the rearward port and rearward starboard sides of UMV 510, respectively. The image sensors used for detection zones 560 and 570 are preferably the same type and/or model and will have a narrow angle of view (e.g., 90 degrees). As shown, detection zone 550 has a small overlap region with detection zone 560 in the rearward direction. Further, based on the position of the image sensors associated with detection zones 550 and 560 (e.g., on conning tower 125 rather than wing housing 120), a dead zone is present for a small region along the central portion of the port and starboard sides UMV 510. It is worth noting that while each of the zones 520, 530, 540, 550, and 560 are shown with respect to the x-y plane, the zones may also extend in the z-direction (not shown).

In some embodiments, information about the location and position of each of the sensors associated with the detection zones 520-560, along with performance parameters for each of the sensors, is generated and stored in a memory element (e.g., memory 330 in FIG. 3 and/or storage unit 230 in FIG. 2). The information may include, but is not limited to, position of the image sensor on the UMV, directional orientation of the image sensor on the UMV, field of view of the image sensor, focal length (f) of the image sensor, height and width (e.g., in pixels) of the sensor element for the image sensor, and the like.

Figure 6:
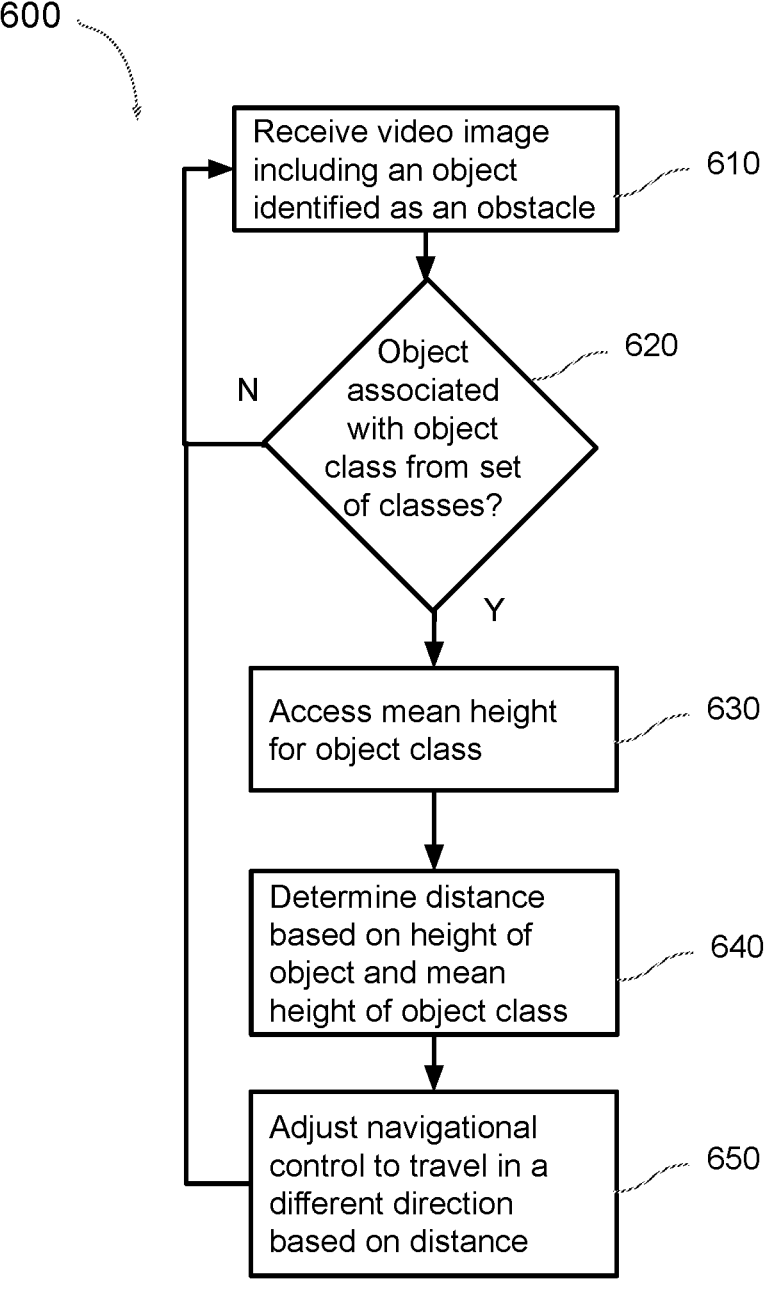
FIG. 6 is a flow chart of an exemplary process for obstacle detection and avoidance according to aspects of the present disclosure.

FIG. 6 illustrates a flow chart of an exemplary process 600 for obstacle detection and avoidance according to aspects of the present disclosure. Process 600 will be primarily described with respect to processing device 300 described in FIG. 3. One or more of the steps in process 600 may equally be applied to the system described in FIG. 2. Further, one or more aspects of process 600 may be carried out as part of the operation of any unmanned UMV and, in particular an autonomous UMV, such as UMV 100 described in FIG. 1. Although process 600 depicts steps performed in a particular order for purposes of illustration and discussion, one or more of the operations discussed herein are not limited to any particular order or arrangement.

At step 610, a video image is received from one or more of the image sensors included on the UMV (e.g., image sensors 210 in FIG. 2). The video image includes or shows an object that has been identified as an obstacle to the navigational course of the UMV. Further, in some embodiments, the image sensor that provided the video is also identified as the position of the image sensor, along with the detection zone associated with the image sensor providing a position or orientation for the object with respect to the UMV. At step 620, a determination is made as to whether the object from the video image, at step 610, is associated with one of the object classes in the set of object classes as part of classification of the object. The set of object classes may be retrieved from short term memory, such as memory 330, or from longer term memory, such as storage unit 230 in FIG. 2. In some embodiments, the determination as to whether the object is associated with one of the object classes may be processed using a machine learning algorithm as described above. If, at step 620, the determination is made that the object is not associated with one of the object classes in the set of object classes, process 600 returns to step 610 and retrieves another video image. It is worth noting that even though the object has not been classified as an object class in the set of object classes, at step 620, the presence of the object and its identification as an obstacle indicates that further processing may still be needed. The further processing may include retrieving further video images (i.e., returning to step 610) that include the object or further classification or characterization in order to associate the object with an existing object class or generate a new object class for the object.

If, at step 620, the determination is made that the object is associated with one of the object classes in the set of object classes, at step 630, the mean height value for the object class associated with the object is accessed. The mean height may be included as part of the data for the set of object classes or may be data stored separately. The mean height may alternatively be retrieved from short term memory, such as memory 330, or from long term memory, such as storage unit 230 in FIG. 2. In some embodiments, at step 630, additional data associated with characteristics of the image sensor(s) from which the video image was received, at step 610, may also be accessed and/or retrieved from memory if this information is not already available to the processor (e.g., processor 310).

At step 640, a distance between the object and the UMV is determined based on the height value of the object in the video image and the mean height value for the object class associated with the object. In some embodiments, the determination of the distance between the UMV and the object in the video image may include calculating the distance as a ratio of the mean height of the object class and the height, in vertical pixels, of the object in the video image as described above. The calculation may be performed using a formula such as the formula described above in FIG. 3. In some embodiments, the distance may be multidimensional, as described above.

At step 650, the navigational control of the UMV is adjusted to travel in a different direction based on the distance determined, at step 640. The adjustment to the navigational control is performed by a control system, such as the navigational control unit 240 in FIG. 2. In some embodiments, a control signal is generated based on the distance by the processing between the object and the UMV generated. The control signal is generated by a processor (e.g., processor 310 or processing unit 220 in FIG. 2) and provided to the control system. The control system processes the control signal and provides signals to the various navigational control elements of the UMV, including propulsion elements (e.g., thrusters 140 in FIG. 1), steering elements (e.g., rudder 130 and payload wing 115), and submersion elements as described above. It is worth noting that the distance between the object and the UMV may provide the primary input for generating the control. However, the position (in one or both of a vertical direction and a horizontal direction) of the object, which may be identified at step 610 or determined at step 640, as well as the object class for the object, which may be identified, at step 620 may also be included in the generation of the control signal As such, in some embodiments, the generation of the control signal, at step 650, may be used to adjust navigational control to travel in a different direction in more than one dimension based on the distance between the object and the UMV. After adjusting the navigational control, at step 650, process 600 returns to step 610 and retrieves another video image.

It is worth noting that one or more of the steps of process 600 may be modified, and/or steps may be added or omitted depending on a specific embodiment. For example, in some embodiments, at step 620, the determination is made that the object is not associated with one of the object classes in the set of object classes, then additional processing may be performed, at step 620, or as part of an additional step added prior to returning to step 610 as described above. The additional processing may include further characterization of the object to determine if the object can be associated with an object class in the set of object classes based on the further characterization. Additionally, or alternatively, the additional processing may include further characterizing using, for example, other processing algorithms, to generate a new object class that can be associated with the object. The further characterization may, in some cases, be performed using processing algorithms that are different from the processing performed for the determination, at step 620, as described. Additionally, the further characterization may require additional time external to the time normally allotted to the determination, at step 620.

Figure 7:
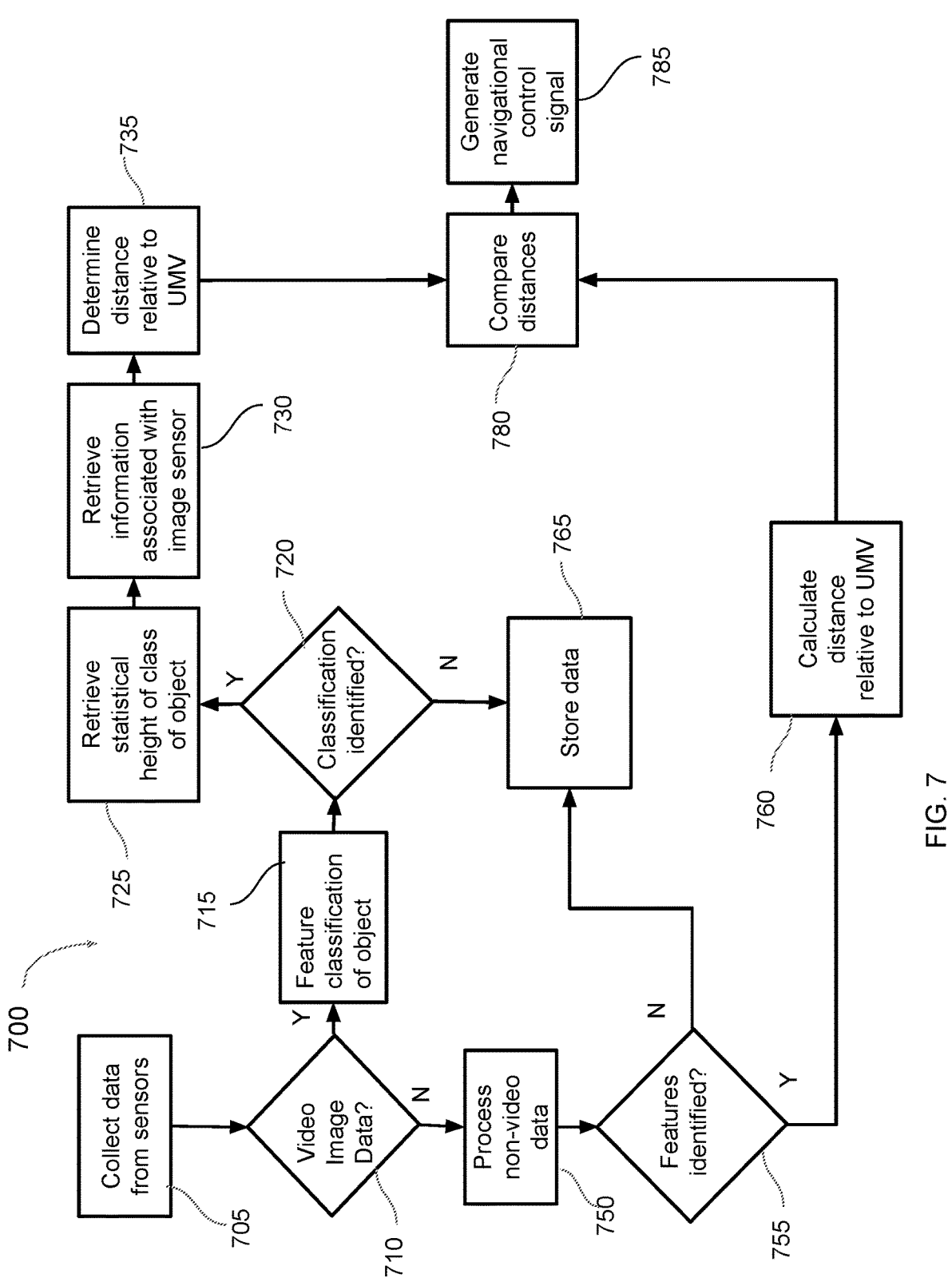
FIG. 7 is a flow chart of another exemplary process for obstacle detection and avoidance according to aspects of the present disclosure.

FIG. 7 illustrates a flow chart of another exemplary process 700 for obstacle detection and avoidance according to aspects of the present disclosure. Process 700 will be primarily described with respect to system 200 described in FIG. 2. One or more of the steps in process 700 may equally be applied to processing 300 described in FIG. 3. Further, one or more aspects of process 700 may be carried out of the operation of any UMV and, in particular an autonomous UMV, such as UMV 100 described in FIG. 1. Although process 700 depicts steps performed in a particular order for purposes of illustration and discussion, one or more of the operations discussed herein are not limited to any particular order or arrangement.

At step 705, sensor data is generated and collected using a plurality of sensors (e.g., image sensors 210, LiDaR sensors 212, SONAR sensors 214). The data from the plurality of sensors is aggregated and provided to a processing element (e.g., processing unit 220. At step 710, a determination is made as to whether any of the data collected, at step 705 is video image data. Video image data is typically data provided from image sensors in the form of a video stream.

If, at step 710, the determination is made that the data is video data, then, at step 715, the video image data is processed in the processing element to identify an object and perform feature classification on the object. In some embodiments, the processing may include sampling the video image data to generate a set of consecutive still video images, referred to as video images, at the periodic sampling rate. One or more of the still video images is further processed using an AI processing engine that employs machine learning techniques. The AI processing engine is included as part of the processing unit (e.g., processing unit 220). In some embodiments, the software code or instructions for an AI processing system may be programmed into a dual core CPU. For example, the dual code CPU may be an NVIDIA® Jetson™ TX2 NX CPU. In some embodiments, the AI processing engine may be virtualized to allow it to be run on other processors that can be configured to run as a virtual machine. For example, the virtualization may be implemented as a docker instance for running the processing or an AI inference engine.

The processing performed in the AI processing engine, at step 715 includes the use of machine learning algorithms that process the color imagery patterns in the video image to find objects. The machine learning algorithms perform feature classification to provide classification of objects based on a plurality of predetermined classes of objects the algorithms can identify and, in real-time, provide bounding regions for the objects from the still video images provided by the sensors, at step 705. The plurality of predetermined classes for objects that can be identified by the machine learning algorithms may be similar to the set of object classes described in table 1 above. The bounding region may be a bounding box, measured in pixels relative to the sensor element, in the cartesian coordinate, or X, Y, coordinate plane. In some embodiments the "you only look once" (YOLO) algorithm is used. The YOLO algorithm uses neural networks to provide real-time object detection. Further, in some embodiments, a list of predetermined objects, such as that described above, that are to be ignored is checked to make sure that these objects are not further processed.

At step 720, a determination is made as to whether the object included in the still video image(s) from the sensors, at step 710, can be identified as one of the classes of objects from the plurality of predetermined classes used by the algorithms, at step 715. If, at step 720, the determination is made that the object cannot be identified as one of the classes of objects from the plurality of predetermined classes used by the algorithms, then at step 765, information identifying the object, such as a name of identification number and the bounding box, as well as other information, such as date and time stamps, is stored as data in a memory element (e.g. storage unit 230). In some embodiments, such as objects that are to be ignored, no further action is taken. In other embodiments, further action may be taken at a later time, such as further classification and/or generation of a new object class, as described above.

If, at step 720, the determination is made that the object cannot be identified as one of the classes of objects from the plurality of predetermined classes used by the algorithms, at step 715, then at step 725, information associated with the statistical or mean height of the identified class of object is retrieved from a memory element (e.g., storage unit 230). In some embodiments, the information associated with the statistical or mean height may be a look up table similar to table 2 described above. At step 730, additional information associated with the image sensor(s) that generated the video image that displayed the object is also retrieved from a memory unit. The information associated with the image sensor(s) may be similar to information described above in FIG. 5.

At step 735, a distance to the object displayed in the video image is determined relative to the position of the UMV. The distance can be determined based on the statistical height of mean height of the class of object retrieved, at step 725, and the height of the object as displayed in the video image, as well as information associated with the image sensor(s) retrieved at step 730. The distance may be determined as a multi-dimensional distance as described above. In some embodiments, the distance may be determined based on additional aspects of the geometry of the object. In some embodiments, the distance may be determined by calculating the distance as a ratio of the mean height of the class of object retrieved and the height, in vertical pixels, of the object as displayed in the video image. For example, a formula similar to the formula described in FIG. 3 may be used.

If, at step 710, the determination is made that the data from the sensors is not video data, then, at step 750, the non video image data is processed to determine the type of data that is present and apply a feature identification process to the data. The processing is performed in a processing unit (e.g., processing unit 220). For example, data from LiDaR sensors can provide some limited imaging information as well as distance information for objects on or above the surface of the water based on the time response of the reflection of the laser signal. Further, data from SONAR sensors (e.g., SONAR sensors 214) can provide some limited information as well as distance information for objects that are below the surface of the water. In general, the ability to identify and/or classify features of an object from the sensor can only be done only over an acceptable range of sensor values, which is less than the detection range of the sensor signal. An object within an acceptable range of sensor values may be referred to as an object in the vicinity of the UMV. As such, a feature identification process may be included with the processing, at step 750, However, the feature identification process may be limited to the acceptable range of the sensor values from the sensors and may not be able to provide a classification of an object containing the features in a manner similar to that described above. Further, the feature identification process may be tailored to the type of sensor data. Additionally, many well-known techniques exist for identifying specific features for objects within the acceptable range and will not be discussed in detail here.

At step 755, a determination is made as to whether any features for an object were identified as part of the processing, at step 750. If, at step 755, the determination is made that no features for an object were identified, then at step 865, information from the sensor data processed at step 750 is stored in a memory unit (e.g., storage unit 220). If, at step 755, the determination is made that one or more features for an object were identified, then at step 760, a distance to the object containing the features identified from the non-video sensor data relative to the position of the UMV is calculated. The distance is calculated in the processing unit (e.g., processing unit 220). For example, sensor data from LiDaR sensors includes time values for the reflections of laser beam pulses off of the object. Similarly, sensor data from SONAR sensors includes time values for the reflections of audio frequency pulses, or pings, off of the object. The time values from the LiDaR sensors and/or the SONAR sensors can be used to calculate the distance to the object relative to the UMV.

At step 780, the calculated distance to the object containing the features identified from the non-video sensor data relative to the position of the UMV, at step 760, is compared to the determined distance to the object displayed in the video image data relative to the position of the UMV, at step 735. The comparison is performed in the processing unit (e.g., processing unit 220). The comparison, at step 780, may provide an indication that the object containing the features identified from the non-video sensor data is the same as the object displayed in the video image data. In some cases, the calculated distance may be different from the determined distance. For example, the profile of the object may be such that the portion of the object that is below the surface of the water is closer or further in distance relative to the position of the UMV than the portion of the object that is above the surface of the water In these cases, further processing may be used to either choose to use the calculated distance, the determined distance, use an adjusted distance as part of further processing.

At step 785, a control signal is generated to adjust the navigational control of the UMV in order to avoid the object. The control signal may be generated based on the determined distance to the object displayed in the video image, at step 735, calculated distance to the object containing features identified from the non-video sensor data, at step 760, or an adjusted distance, based on the comparison of the determined distance and the calculated distance, at step 780. The control signal is generated by a processing unit (e.g., processing unit 220) and provided to a control unit for the UMV (e.g., navigational control unit 240). The control unit processes the control signal and adjusts the various navigational control elements of the UMV as described above.

It is worth noting that one or more of the steps of process 700 may be modified, and steps may be added or omitted depending on a specific embodiment. For example, in some embodiments, the comparison of distances, at step 780 may be stored in a memory unit, such as at step 765 and/or used to adjust the parameters and information associated with one or more of the classes objects in the plurality of predetermined classes of objects. Further, the features identified, at step 755, may be provided as a complement to the video image data as part of classification of the object, at step 715. In this manner, the machine learning algorithms used at step 715 may use data from video images as well as data from other sensors, such as SONAR sensors as part of classification of the object. Additionally, although not shown, the steps of process 700 may be performed repetitively in a manner similar to process 600. Further, one or more of the steps of process 700 may be carried out in conjunction with one or more of the steps of process 600 described in FIG. 6. As such, some or all of the steps of process 600 and some or all of the steps of process 700 may be combined to form a different process for obstacle detection and avoidance.

Figure 8:
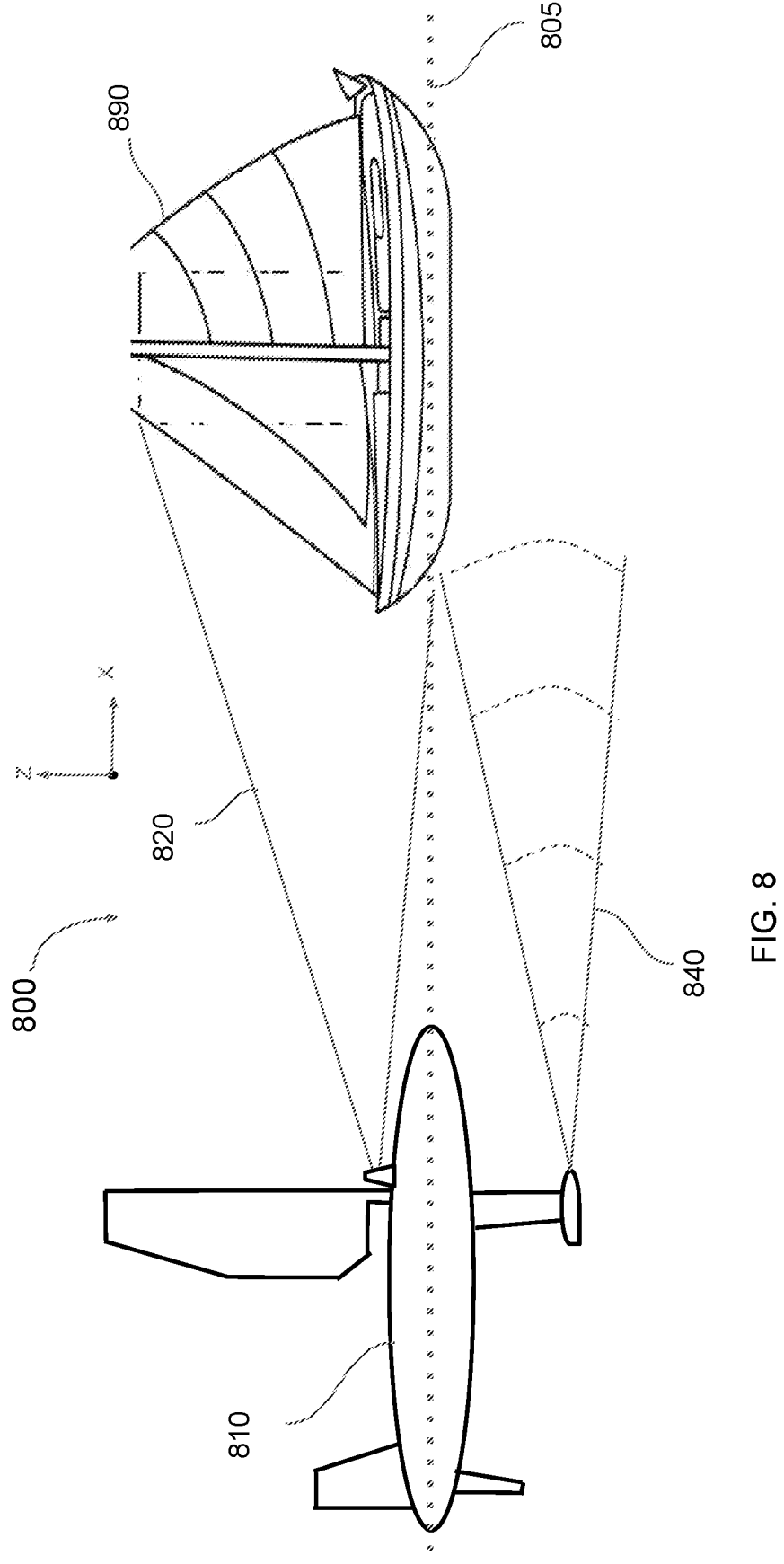
FIG. 8 is an exemplary diagram illustrating the detection of an object according to aspects of the present disclosure.

FIG. 8 is an exemplary diagram 800 illustrating the detection of an object according to aspects of the present disclosure. FIG. 8 specifically illustrates the detection of an object that has been identified as an obstacle using one or more steps of process 700 described in FIG. 7. An orientation axis is shown with x and z on the planar surface of the page and y oriented inward from the surface of the page. UMV 810 is shown oriented on the surface of the water, as shown by the surface waterline 805, such that the bow of UMV 810 is in the x direction. A portion of object 890 is contained in a video image as part of the field of view detection range 820 of an image sensor on UMV 810. The image sensor may be similar to the type described for image sensors 210 in FIG. 2 and positioned on the wing housing of UMV 810 in a manner similar to that described in FIG. 1. Further, another portion of object 890 is detected as a signal reflection within the range of detection 840 of a SONAR sensor on UMV 810 as described above. The SONAR sensor may be similar to the type described for SONAR sensors 214 in FIG. 2 and positioned on the payload keel of UMV 810 in a manner similar to that described in FIG. 1. More specifically, the video image generated by the image sensor contains the portion of object 890 that is visible above the surface of the water while the signal from the SONAR sensor detects the draught of the object 890, or the portion of object 890 that is submerged below the surface of the water.

The video image of object 890 may be processed using algorithms similar to those described above. One or more of these algorithms may be used to determine if the object should be identified as an obstacle. Further, one or more of these algorithms may also be used to determine if the obstacle is associated with one of the predetermined object classes. For example, a YOLO algorithm similar to that described at step 715 in FIG. 7. A distance between object 890 and UMV 810 may be determined using information associated with the video image, the image sensor, and the object class for object 890 in a manner as described above.

The reflected signal, representing object 890, generated by the SONAR sensor on UMV 810 may be processed in a manner similar to that described at step 755. The processed information may be used to also determine a distance between object 890 and UMV 810 and may further be compared with the distance determined using the video image in a manner similar to that described at step 780. Further, in some embodiments, features identified from the reflected signal may be provided as a complement to the video image as part of classification of object 890 or used to help identify object 890 as part of a new object class.

It is worth noting that the steps of process 600 may also be applied to diagram 800. More specifically, a video image of object 890 may be received from an image sensor on UMV 810 and processed as described at steps 610 and 620. Further, the distance between the UMV 810 and the object 890 may be determined and navigational control of the UMV 810 adjusted as described at steps 630, 640, and 650. The reflected signal, representing object 890, generated by the SONAR sensor on UMV 810 is not used as part of process 600. Further, one or more of the steps of process 700 may be carried out in conjunction with one or more of the steps of process 600 described in FIG. 6 and applied to diagram 800.

It is to be appreciated that although the embodiments described above focus on physical hardware and components within an electronic system, the principles of the present disclosure may be easily extended to implementations that involve software-based programming instructions that are stored in a computer readable medium, such as a magnetic or optical based storage structure. Further, in some embodiments, one or more of the steps of a process based on the principles of the present disclosure, such as process 600 and/or process 700 described above, may be implemented utilizing cloud-based operations and/or storage. It is to be appreciated that, except where explicitly indicated in the description above, the various features included as part of the principles of the present disclosure can be considered cumulative and interchangeable, that is, a feature shown in one embodiment may be incorporated into another embodiment.

Although embodiments which incorporate the teachings of the present disclosure have been shown and described in detail herein, those skilled in the art can readily devise many other varied embodiments that still incorporate these teachings. Having described preferred embodiments for a system and method to avoid obstacles in an autonomous unmanned maritime vehicle, it is noted that modifications and variations can be made by persons skilled in the art in light of the above teachings. It is therefore to be understood that changes may be made in the particular embodiments of the disclosure which are within the scope of the disclosure as outlined by the appended claims.

The invention claimed is:

1. A system for detecting and avoiding an obstacle of an autonomous unmanned maritime vehicle (UMV) traveling in an initial direction, the system including:
    at least one image sensor, the at least one image sensor configured to generate a plurality of video images;
    a storage element configured to receive and store information associated with a plurality of predetermined object classes; and
    a processing unit coupled to the at least one sensor and the storage element, the processing unit configured to:
    receive at least one video image from the at least one image sensor, the video image containing at least one object;
    determine if the at least one object can be associated with an object class from the plurality of predetermined object classes that has been identified as an obstacle;
    access a mean height value for the object class if it is determined that the at least one object can be associated with an object class from the plurality of predetermined object classes that has been identified as an obstacle;
    determine a distance between the UMV and the at least one object based on a height of the at least one object as displayed in the video image and the mean height for the object class; and
    automatically adjust the navigational control of the autonomous UMV to travel in an adjusted direction.

2. The system of claim 1, further comprising a navigational control unit coupled to the processing unit, wherein the processing unit is further configured to;
    generate at least one control signal based on the determined distance between the UMV and the at least one object; and
    provide the at least one control signal to the navigational control unit in order to generate a navigational response in the UMV to the at least one object.

3. The system of claim 2 wherein the navigational response is an evasive maneuver.

4. The system of claim 1, further comprising at least one sound navigation ranging (SONAR) sensor coupled to the processing unit, wherein the processing unit is further configured to:
    receive data from the at least one SONAR sensor, the data including an indication of the presence of an object in the vicinity of the UMV;
    calculate a distance between the UMV and the object in the vicinity based on the data received from the at least one SONAR sensor;
    compare the calculated distance between the UMV and the object in the vicinity based on the data received from the at least one SONAR sensor to the determined distance between the UMV and the at least one object based on the height of the at least one object as displayed in the video image and the mean height for the object class; and

24 automatically adjust the navigational control of the autonomous UMV to travel in an adjusted direction based on the comparison.

5. The system of claim 1 wherein the distance includes a distance in more than one dimension.

6. The system of claim 1, wherein the processing unit is further configured to access information about the image sensor from the storage unit, the information used to determine the height of the at least one object.

7. The system of claim 6, wherein the information about the image sensor includes at least one of position of the image sensor, field of view of the image sensor, focal length of the sensor, and pixel count of the image sensor.

8. The system of claim 1, wherein determining the distance between the UMV and the at least one object includes calculating the distance as a ratio of the mean height of the object class and the height, in vertical pixels, of the at least one object as displayed in the video image.

9. The system of claim 8, wherein the distance is calculated using the following formula: distance=(f*real height*image height)/(object height*sensor height); where: distance=distance from object to image sensor f=the focal distance of the camera, real height=estimate of the object height based on mean height of object class, image height=height of total image in pixels object height=number of vertical pixels the object occupies in the video image, and sensor height=the camera sensor height.

10. The system of claim 1, wherein the determination of whether the object falls within an object class is processed using a machine learning algorithm.

11. The system of claim 1, wherein the processing unit is further configured to classify the at least one object to generate a new object class if it is determined that the at least one object cannot be associated with an object class from the plurality of predetermined object classes.

12. The system of claim 11, wherein the processing unit is further configured to store the new object class in the storage element.

13. The system of claim 11, wherein the classification of the at least one object is processed using a machine learning algorithm.

14. The system of claim 13, wherein the machine learning algorithm is a you only look once (YOLO) algorithm.

15. A method for detecting and avoiding an obstacle of an autonomous unmanned maritime vehicle (UMV) traveling in an initial direction, the method comprising:
    receiving, a video image from at least one image sensor, the video image containing at least one object;
    determining if the at least one object can be associated with an object class from the plurality of predetermined object classes that bas been identified as an obstacle;
    accessing a mean height value for the object class if it is determined that the at least one object can be associated with an object class from the plurality of predetermined object classes that has been identified as an obstacle;
    determining a distance between the UMV and the at least one object based on a height of the at least one object as displayed in the video image and the mean height for the object class; and
    automatically adjusting the navigational control of the autonomous UMV to travel in an adjusted direction.

16. The method of claim 15, further comprising:
    generating at least one control signal based on the determined distance between the UMV and the at least one object; and providing the at least one control signal to a navigational control unit in order to generate a navigational response in the UMV to the at least one object.

17. The method of claim 15, further comprising:

receiving data from the at least one SONAR sensor, the data including an indication of the presence of an object in the vicinity of the UMV;

calculating a distance between the UMV and the object in the vicinity based on the data received from the at least one SONAR sensor;

comparing the calculated distance between the UMV and the object in the vicinity based on the data received from the at least one SONAR sensor to the determined distance between the UMV and the at least one object based on the height of the at least one object as displayed in the video image and the mean height for the object class; and automatically adjusting the navigational control of the autonomous UMV to travel in an adjusted direction based on the comparison.

18. The method of claim 15, wherein determining the distance between the UMV and the at least one object includes calculating the distance as a ratio of the mean height of the object class and the height, in vertical pixels, of the at least one object as displayed in the video image.

19. The method of claim 15, further comprising classifying the at least one object to generate a new object class if it is determined that that the at least one object cannot be associated with an object class from the plurality of predetermined object classes.

20. A method for detecting and avoiding an obstacle of an autonomous unmanned maritime vehicle (UMV) traveling in an initial direction, the method comprising:

receiving, a video image from at least one image sensor, the video image containing at least one object;

determining if the at least one object can be associated with an object class from the plurality of predetermined object classes;

accessing a mean height value for the object class if it is determined that the at least one object can be associated with an object class from the plurality of predetermined object classes;

determining a distance between the UMV and the at least one object based on a height of the at least one object as displayed in the video image and the mean height for the object class;

receiving data from the at least one SONAR sensor, the data including an indication of the presence of an object in the vicinity of the UMV;

calculating a distance between the UMV and the object in the vicinity based on the data received from the at least one SONAR sensor;

comparing the calculated distance between the UMV and the object in the vicinity based on the data received from the at least one SONAR sensor to the determined distance between the UMV and the at least one object based on a height of the at least one object as displayed in the video image and the mean height for the object class; and automatically adjust the navigational control of the autonomous UMV to travel in an adjusted direction based on the comparison.

* * * * *